United States Patent [19]

Nicoletti

[11] 3,965,700
[45] June 29, 1976

[54] DRIVE LINE COUPLING DEVICE WITH SUBSTANTIALLY HOMOKINETIC FEATURES

[76] Inventor: Emilio Nicoletti, Via pietro Kandler, 7, Trieste, Italy, 34100

[22] Filed: Nov. 11, 1974

[21] Appl. No.: 522,804

[52] U.S. Cl. ................................. 64/18; 64/21; 64/17 R
[51] Int. Cl.² .......................................... F16D 3/42
[58] Field of Search ..................... 64/18, 17 R, 21

[56] References Cited
UNITED STATES PATENTS

| | | | |
|---|---|---|---|
| 2,920,709 | 1/1960 | Holmes et al. | 64/18 |
| 3,456,458 | 7/1969 | Dixon | 64/18 |
| 3,517,528 | 6/1970 | Eccher | 64/21 |

Primary Examiner—Samuel Scott
Assistant Examiner—Randall Heald
Attorney, Agent, or Firm—Guido Modiano; Albert Josif

[57] ABSTRACT

A homokinetic universal joint drive line coupling device which comprises a drive shaft, a driven shaft and two yokes each of them being affixed to one of the shafts and pivotally engaging a respective gimbal ring at one of its diameters, both of the gimbal rings being arranged concentrically while the pivot points are aligned with each other along a diameter when the two shafts are in line. The device is also provided with two diametrically opposed pivot members which pivotally engage the two intervening concentric gimbal rings, an auxiliary universal joint, concentric to said gimbal rings and idly engaging the two converging shafts. The spider of the supporting universal joint are mounted pivotally at a concentric diameter perpendicular to the diameter of the yoke pivot points through one of the gimbal rings while the auxiliary joint yoke is at all times, when the shafts are aligned, with the spider pivot points located on the same diameter as the pivot members joining the two rings.

3 Claims, 3 Drawing Figures

DRIVE LINE COUPLING DEVICE WITH SUBSTANTIALLY HOMOKINETIC FEATURES

BACKGROUND OF THE INVENTION

This invention relates to a multiple universal joint type of coupling device for drive lines having substantially or totally homokinetic power drive features.

It is known that a gimbal or universal joint is commonly employed to transfer rotary motion between two shafts placed at an angle to each other, and although its performance is fairly efficient, alternating rotational velocity variations do occur between such shafts. This drawback has somewhat restricted the application of this type of joint or gimballed device in many an industrial field, such as the automotive industry, where it is required that the rotary motion be transferred in a perfectly smooth or homokinetic way throughout the 360° of rotation of the joint.

Intensive research work has been devoted to the subject in order to overcome the above difficulty. The one drive line coupling device so far developed which has proved successful in part and has been adopted in the industry, is the dual universal joint type. However, the optimum operation of this known drive line coupling device is subject to serious limitative conditions, such as the coplanarity of the three rotating shafts and the symmetry with respect to a centerplane orthogonal to the intermediate shaft member, and these requirements, in turn, involve a bulky and costly construction.

SUMMARY OF THE INVENTION

It is a major object of this invention to eliminate such drawbacks and limitations in the conventional drive line couplings described above.

Another object of the invention is to provide a homokinetic type of drive line coupling device incorporating multiple universal joints, which avoids the necessity for a third intermediate drive shaft.

A further object of the invention is to provide a coupling device as above which is inherently homokinetic for relative angles of the two converging shafts not constrained to lie in the same plane but in any included within a wide cone, and still retaining substantially the same overall dimensions and assembling simplicity which characterize a conventional single universal joint type of coupling.

These and other objects, such as will become apparent hereinafter, are achieved by a practically homokinetic universal joint drive line coupling device according to the invention, comprising: a drive shaft and a driven shaft, two yokes each of said yokes being rigidly affixed to one of said shafts and pivotally engaging a respective gimbal ring at a diameter thereof, both said gimbal rings being arranged concentrically while said pivot points are aligned with each other along a diameter when said two shafts are in line, two diametrically opposed pivot members pivotally engaging said two intervening concentric gimbal rings, said pivot members being arranged at approximately 45° to the diameter through said yoke pivot points, an auxiliary universal joint, concentric to said gimbal rings and idly engaging said two converging shafts, the spider of said supporting universal joint being mounted pivotally at a concentric diameter orthogonal to the diameter of said yoke pivot points through one of said gimbal rings while the auxiliary joint yoke, idly engaged onto the shaft, whose gimbal ring does not engage the spider, is at all times, when the shafts are in line, with its spider pivot points located on the same diameter as the pivot members joining the two rings, the universal joint axes converging in the center.

BRIEF DESCRIPTION OF THE DRAWINGS

Further features and advantages of the invention will become apparent from the description that follows of one preferred and schematic embodiment thereof, selected by way of example only in order to clarify the kinetic principles involved, and the attached drawing, wherein.

DESCRIPTION OF THE PREFERRED EMBODIMENT

Figures 1, 2, 3:
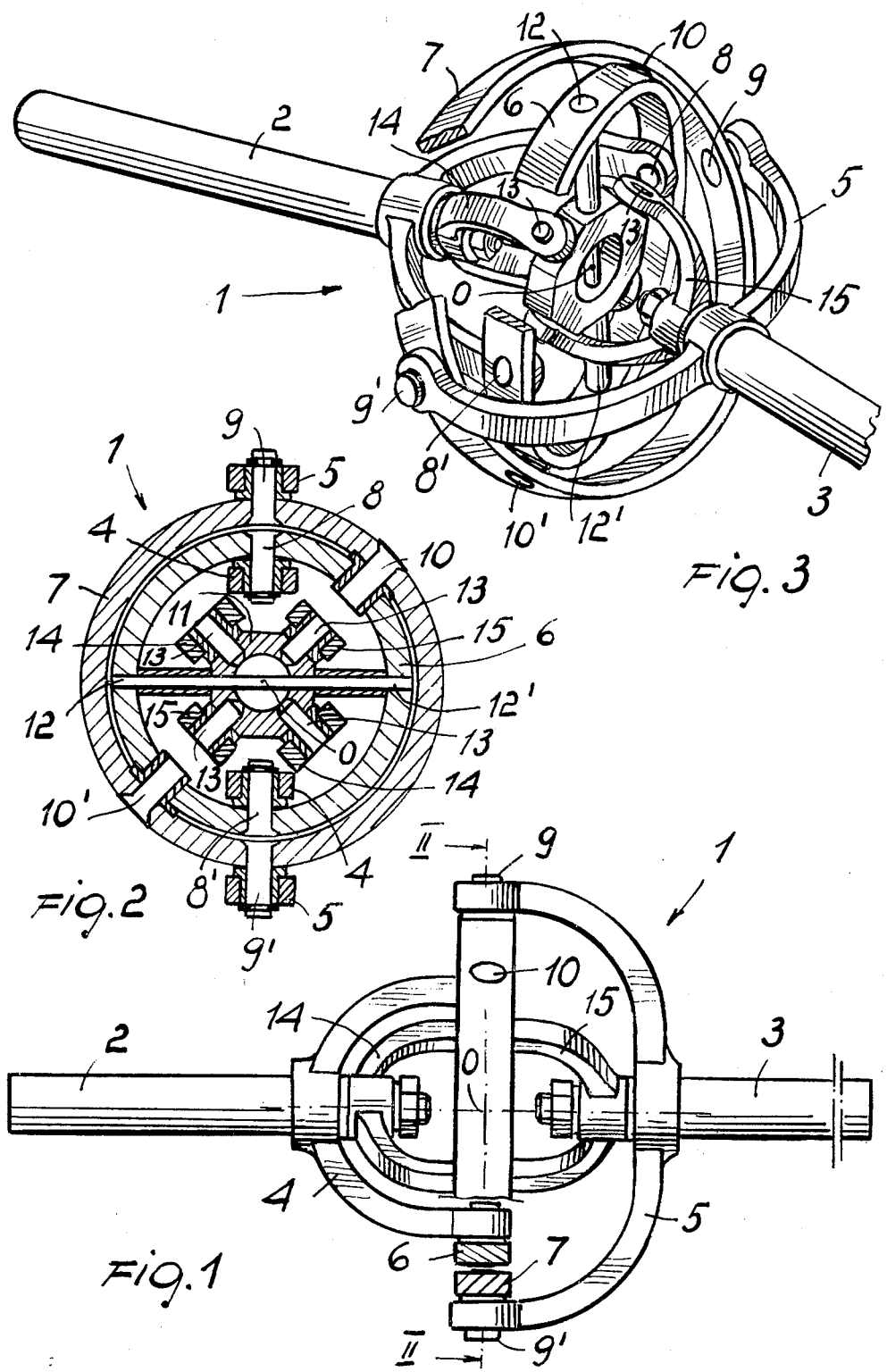
FIG. 1 is a side view of a coupling device according to the invention, the driving yokes being represented as if in the same plane as the sheet.
FIG. 2 is a partially cut-away view, along the line II—II of FIG. 1.
FIG. 3 is a perspective view of a complete homokinetic drive line coupling device according to the invention.

In the drawing, the numeral 1 indicates generally a coupling device according to the invention, 2 and 3 identify two respective rotary shafts which may be arranged at an angle to each other but at all times converging in the center O of the assembly; 4 and 5 are two respective yokes rigidly keyed one to each shaft.

The trunnions 8 and 8' form the pivot connection between the yoke 4 and the gimbal ring 6, while the trunnions 9 and 9' connect the yoke 5 to the gimbal ring 7. When both shafts are in line, the trunnions 8,8' and 9,9' are by construction aligned on a diameter passing through the center O.

The two rings are further pivotally interconnected by trunnions 10 and 10' also arranged along a diameter through the center O at a 45° angle to the axis through the trunnions 8,8'. The center area of the device is occupied by a spider 11 for an auxiliary universal joint, otherwise left idle, constituting the core of the assembly.

The spider member is pivotally mounted to the inner ring 6 by means of trunnions 12, 12' of a rod integral to the spider itself; the axis of the trunnions 12, 12' is a diameter also through the center and at 90° to the diameter through the trunnions 8,8' in the same ring.

To said spider member are affixed, with threaded trunnions 13, two yokes 14 and 15, idly mounted on the ends of shafts 2 and 3, respectively. These two yokes are arranged, as in all conventional universal type joints, in planes at 90° to each other, the pivot axis of the yoke 15 coinciding with the axes of the trunnions 10, 10' in the aligned state shown in the drawing.

The specific operation of the coupling device according to the invention, and how its unique advantages are achieved, will be now described. A complete description of the coupling device using two universal joints as previously discussed would require an extensive argumentation, not so easy to understand even for the expert. Thus an attempt will be made here to provide an elementary, though correct, explanation of the results obtained, without any intention to restrict the invention to this interpretation thereof.

A simplified representation of the device is first considered which includes only the two shafts, two gimbal rings and associated yokes, these elements being interconnected as shown, leaving momentarily out the special arrangement of the trunnions 10, 10'. It should be recognized that this is the limit to which a dual universal joint drive line may be reduced when the drive shaft is removed, the two gimbal rings being obviously the equivalent of two spider members but with the additional advantage that they may be arranged concentrically. The constraint provided for the rings by the diametrical arrangement of the pivot points is not enough to define the joint, which still has excess degrees of freedom and as such cannot transfer torque from one shaft to the other. Therefore, it is expedient to reconsider the constraint geometry such as it was in the known type of homokinetic drive line using two universal joints, wherefrom this arrangement first derives. Progressing step by step from essentials, it should be noted first that the two gimbal rings are unable to transfer torque from one to the other since they are both rotatable in their respective yokes. It is necessary, thus, to assume that at least one of them is constrained to another axis through the joint center. The ring 6 is considered, for example. In order to reproduce the ideal condition, with two universal joints, it is apparent that it will be sufficient to constrain a diametrical axis of said ring, at 90° to the axis of the trunnions 8,8', i.e. it is sufficient to connect it by means of a rod, in the drawing the rod of the trunnions 12,12', to the spider 11. It can thus be seen that the spider 11 performs in the joint according to the invention a kinetic role similar to that performed by the drive shaft in the ideal drive using two universal joints. Again using the same analogy, the two idly mounted yokes constrained to said spider must have the axes of their pivot points (13 in the drawing) each symetrically placed at 45° with respect to the rod or crossmember 12,12', in the plane of the spider.

The position of the axes of the trunnions 10, 10', left intentionally undefined in the above paragraphs, remains only to be defined. From a study of the projections of the traces of the ball joint according to the invention onto the concentric sphere representing it, not shown since it is part of an analysis method well known per se, it appears that the symmetry requirement is met and the motion transferred will be homokinetic, provided that the axes of the trunnions are located on a diameter of the ring 6 forming a 45° angle with the diametrical axis of the pivot points 8,8', i.e., with reference to FIG. 2, that the axis of the trunnions 10, 10' coincides with the axis of the threaded trunnions 13, 13' of the yoke 15 on the spider 11, which axis has the property of lying at all times in a perfect or almost perfect manner in the symmetry plane of the assembly. Obviously, this reasoning conducted inductively about the requirements and mechanical features could also be evolved in a purely deductive manner based upon a geometrical representation in a spherical projection, which, however, the expert shall have no difficulty to make by himself. Examples and results — In order to verify the results attainable in practicing the invention, in view of the approximations of the theory, and above all, of the manufacturing and assembling tolerances, a coupling device according to the invention has been made which had an outer diameter for the larger ring equal to about 100 mm, while the other dimensions were approximately similar to the proportions of the drawing, using manufacturing tolerances corresponding to the normal tolerances adopted in the industry for the manufacture of industrial joints, e.g. for earthmoving machinery and the like. For such a coupling device, the anticipated departure from the phase angle between the two shafts during one revolution was calculated for various angles, based upon the possible average errors. Next, that same coupling device underwent laboratory checks. The following table shows the maximum departures found in one cycle, which as it is well known, exhibit an approximately sinusoidal pattern.

For comparison, there are indicated the values obtained for a single universal joint and a drive line with two symmetrical universal joints in ideal coplanarity conditions. The angle between the two shafts in the drive line was in all cases 35°.

| Test | maximum departure angle calculated | actual |
|---|---|---|
| 1) Coupling device according to the invention | +0.64 degrees<br>−0.60 degrees | +0.50 degrees<br>−0.55 degrees |
| 2) Drive line with two universal joints | — | +0.52 degrees<br>−0.51 degrees |
| 3) Universal joint | 7 degrees (approx.) | 7 degrees (approx.) |

Considering the close similarity of the more significant departures for the coupling device of the invention and the drive line with two universal joints, it may be stated that these originate from machining tolerances and can be further reduced, although the values shown are acceptable and highly desirable, since such small deviations may be allowed for either by the flexibility of the shafts themselves, if made long enough, or alternatively by providing a simple flexible axial coupling.

In addition to the advantages sought and demonstrated above, it should be noted that, whereas with a dual universal joint drive line the achievement of ideal conditions requires that the deflections of the three shafts be kept in the same original plane, with the novel homokinetic coupling device of the invention one shaft may deflect with respect to the other shaft through any angle within a cone only limited by the same interfering mechanical restraints present in a single universal joint. Furthermore, no free axial slip is required. The aforesaid schematic construction may be modified for what concerns its design and arrangement to suit varying application requirements; however, from the explanation provided of the principles involved it appears that many other approaches may be considered as equivalents thereof and thus within the scope of the invention. Thus, for instance, the supporting universal joint, together with the idly mounted yokes 14 and 15, may be arranged outside the ring 7 rather than inside the ring 6, obviously by configurating the spider 11 in the shape of a larger concentric ring. In such a case, the spider or outer ring 11 would be more conveniently connected pivotally to the ring 7 through a crossmember 12, 12', following which, the question of symmetry mentioned above would repropose itself in much the same terms, similarly identifying all the parameters already indicated. Moreover, the angular positions of the diametrical axes, e.g. the 45° one previously specified, should not be taken as restrictive, but small deviations are permissible.

I claim:

1. A substantially homokinetic universal joint drive line coupling device comprising: a drive shaft and a driven shaft, two yokes each of said yokes being rigidly affixed to one of said shafts and pivotally engaging a respective gimbal ring at a diameter thereof, both said gimbal rings being arranged concentrically while said pivot points are aligned to each other along a diameter when said two shafts are in line, two diametrically opposed pivot members pivotally engaging said two intervening concentric gimbal rings, said pivot members being arranged at approximately 45° to the diameter through said yoke pivot points, an auxiliary universal joint, concentric to said gimbal rings and idly engaging said two converging shafts, the spider of said supporting universal joint being mounted pivotally at a concentric diameter orthogonal to the diameter of said yoke pivot points through one of said gimbal rings while the auxiliary joint yoke, idly engaged onto the shaft, whose gimbal ring does not engage the spider, is at all times, when the shafts are in line, with its spider pivot points located on the same diameter as the pivot members joining the two rings, the universal joint axes converging in the center.

2. A coupling device according to claim 1, wherein said supporting universal joint concentric to the rings is located inside the rings and its spider is pivotally mounted on the internal one of said two rings.

3. A coupling device according to claim 1, wherein said supporting universal joint is located outside said two rings and concentrically thereto, its spider being in the shape of a third ring pivotally mounted on the outside one of the cited rings.

* * * * *